(12) United States Patent
Balsiger et al.

(10) Patent No.: US 11,371,596 B2
(45) Date of Patent: Jun. 28, 2022

(54) COMPOUND HARMONIC GEARBOX CONFIGURED FOR CONTINUOUS OUTPUT ROTATION

(71) Applicant: Hamilton Sundstrand Corporation, Charlotte, NC (US)

(72) Inventors: Derick S. Balsiger, Mayer, AZ (US); Keith Bloxham, Gilbert, AZ (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 162 days.

(21) Appl. No.: 16/566,174

(22) Filed: Sep. 10, 2019

(65) Prior Publication Data
US 2021/0071744 A1     Mar. 11, 2021

(51) Int. Cl.
*F16H 49/00*     (2006.01)

(52) U.S. Cl.
CPC ..... *F16H 49/001* (2013.01); *F16H 2049/003* (2013.01)

(58) Field of Classification Search
CPC .......................... F16H 49/001; F16H 2049/003
See application file for complete search history.

(56) References Cited

U.S. PATENT DOCUMENTS

| | | | | |
|---|---|---|---|---|
| 4,003,272 A | * | 1/1977 | Volkov | F16H 49/001 74/640 |
| 5,061,227 A | * | 10/1991 | Fickelscher | F04C 15/0065 475/170 |
| 9,157,517 B2 | | 10/2015 | Lunin et al. | |
| 9,915,334 B2 | | 3/2018 | Balsiger et al. | |
| 2015/0345606 A1 | * | 12/2015 | Balsiger | F16H 49/001 74/405 |
| 2018/0038467 A1 | | 2/2018 | Balsiger et al. | |
| 2018/0112760 A1 | * | 4/2018 | Balsiger | B64C 13/38 |
| 2019/0107188 A1 | | 4/2019 | Balsiger | |
| 2020/0393030 A1 | * | 12/2020 | Guan | F16H 1/32 |

FOREIGN PATENT DOCUMENTS

| | | |
|---|---|---|
| CN | 110145586 A | 8/2019 |
| DE | 1905192 A1 | 8/1970 |
| DE | 2505155 A1 | 8/1976 |
| EP | 3165795 A1 | 5/2017 |
| EP | 3276209 A1 | 1/2018 |
| EP | 3312475 A2 | 4/2018 |

OTHER PUBLICATIONS

Extended European Search Report; Application No. 19212912.0; dated Mar. 25, 2020; 10 pages.

* cited by examiner

*Primary Examiner* — Terence Boes
(74) *Attorney, Agent, or Firm* — Cantor Colburn LLP

(57) ABSTRACT

Disclosed is a compound harmonic gearbox having: a first ground gear and a second ground gear being interconnected about a stationary shaft to form a housing, wherein only the first ground gear includes gearbox mounting features; an output flange partially encased within the housing; a flex spline within the housing that drives the output flange; a wave generator within the housing that drives the flex spline; an input shaft with an input gear that drives the wave generator, the input shaft extending through the first ground gear, wherein the output flange is configured to rotate completely around the stationary shaft by rotating the input shaft.

17 Claims, 8 Drawing Sheets

COMPOUND HARMONIC GEARBOX CONFIGURED FOR CONTINUOUS OUTPUT ROTATION

BACKGROUND

Exemplary embodiments pertain to the art of gearboxes and more specifically to a compound harmonic gearbox configured for continuous output rotation.

Compound harmonic gearboxes enable achieving a high power density. Such gearboxes may be used in machinery requiring high torque output at low speeds. Such gearboxes may also be compact and lightweight.

BRIEF DESCRIPTION

Disclosed is a compound harmonic gearbox comprising: a first ground gear and a second ground gear being interconnected about a stationary shaft to form a housing, wherein only the first ground gear includes gearbox mounting features; an output flange partially encased within the housing; a flex spline within the housing that drives the output flange; a wave generator within the housing that drives the flex spline; an input shaft with an input gear that drives the wave generator, the input shaft extending through the first ground gear, wherein the output flange is configured to rotate completely around the stationary shaft by rotating the input shaft.

In addition to one or more of the above disclosed aspects or as an alternate wherein the input shaft extends through an input-shaft channel in one of a first axial end wall of the first ground gear and a first radial outer shell of the first ground gear.

In addition to one or more of the above disclosed aspects or as an alternate one or more input-shaft bearings are disposed in the input-shaft channel for rotational positioning of the input shaft.

In addition to one or more of the above disclosed aspects or as an alternate the input shaft extends axially through the first axial end wall and is radially offset from an axial center of the stationary shaft; and the input gear defines a first spur gear, and an axial end of the wave generator defines a second spur gear that meshes with the first spur gear.

In addition to one or more of the above disclosed aspects or as an alternate the input shaft extends radially through the first radial outer shell of the first ground gear; and the input gear defines a first bevel gear and an axial end of the wave generator defines a second bevel gear that meshes with the input gear.

In addition to one or more of the above disclosed aspects or as an alternate the gearbox includes a stationary-shaft bearing, wherein: a portion of the stationary shaft defines a stationary-shaft bearing inner race; a stationary-shaft bearing outer race is connected to the wave generator; and a stationary-shaft bearing rolling element is disposed therebetween.

In addition to one or more of the above disclosed aspects or as an alternate the gearbox includes a drive bearing including a drive bearing inner race connected to the wave generator, a drive bearing outer race connected to the flex spline, and a drive bearing rolling element therebetween.

In addition to one or more of the above disclosed aspects or as an alternate the drive bearing and the flex spline have a same axial span and are axially aligned with one another.

In addition to one or more of the above disclosed aspects or as an alternate the first radial outer shell of the first ground gear is disposed against a first axial side of the output flange and a second radial outer shell of the second ground gear is disposed against a second axial side of the output flange, whereby the output flange is partially encased in the housing.

In addition to one or more of the above disclosed aspects or as an alternate the stationary shaft extends axially from a second axial end wall of the second ground gear and is secured to the first axial end wall of the first ground gear to thereby form the housing.

In addition to one or more of the above disclosed aspects or as an alternate the first axial end wall includes an opening that forms a keyway and the stationary shaft includes a key.

In addition to one or more of the above disclosed aspects or as an alternate the axial end of the stationary shaft includes a threaded tip configured to receive a nut to secure the first ground gear and the second ground gear to one another, thereby securing the housing at the output flange.

In addition to one or more of the above disclosed aspects or as an alternate the gearbox includes a plurality of support bearings respectively disposed on axially opposing ends of the flex spline.

In addition to one or more of the above disclosed aspects or as an alternate the flex spline includes a plurality of splines that are outer facing, including an output spline, a first ground spline on one side of the output spline and a second ground spline on another side of the output spline, so that the second ground spline is axially offset from the first ground spline, and the output spline is axially between the first ground spline and the second ground spline, whereby the flex spline is configured as a compound spline.

In addition to one or more of the above disclosed aspects or as an alternate the output flange includes output gear teeth that mesh with the output spline, the first ground gear includes first ground gear teeth that mesh with the first ground spline, and the second ground gear includes second ground gear teeth that mesh with the second ground spline.

In addition to one or more of the above disclosed aspects or as an alternate the first ground spline and the first ground gear teeth are configured to mesh to thereby form a first gear ratio, and the output spline and the output gear teeth are configured to mesh to thereby form a second gear ratio that differs from the first gear ratio to form a compound gear ratio.

In addition to one or more of the above disclosed aspects or as an alternate the second ground spline and the second ground gear teeth are configured to mesh and form the first gear ratio.

In addition to one or more of the above disclosed aspects or as an alternate the second spur gear and the first ground gear teeth are axially positioned at axially opposing ends of the stationary-shaft bearing; and a first support bearing of the plurality of support bearings is positioned axially intermediate the second spur gear and the first ground gear teeth.

In addition to one or more of the above disclosed aspects or as an alternate the gearbox mounting features are threaded-holes.

Further disclosed is a method of operating a compound harmonic gearbox, comprising: rotating an input shaft that extends through one of a first axial end wall of a first ground gear or a first radial outer shell of the first ground gear, wherein the first ground gear is interconnected with a second ground gear about a stationary shaft to form a housing, and only the first ground gear includes gearbox mounting features; rotating an input gear by rotating the input shaft; rotating a wave generator by rotating the input gear, the wave generator rotating completely around the stationary shaft of the gearbox; rotating a flex spline by rotating the wave generator; and rotating an output flange by rotating the flex spline, whereby the output flange rotates completely around the stationary shaft.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
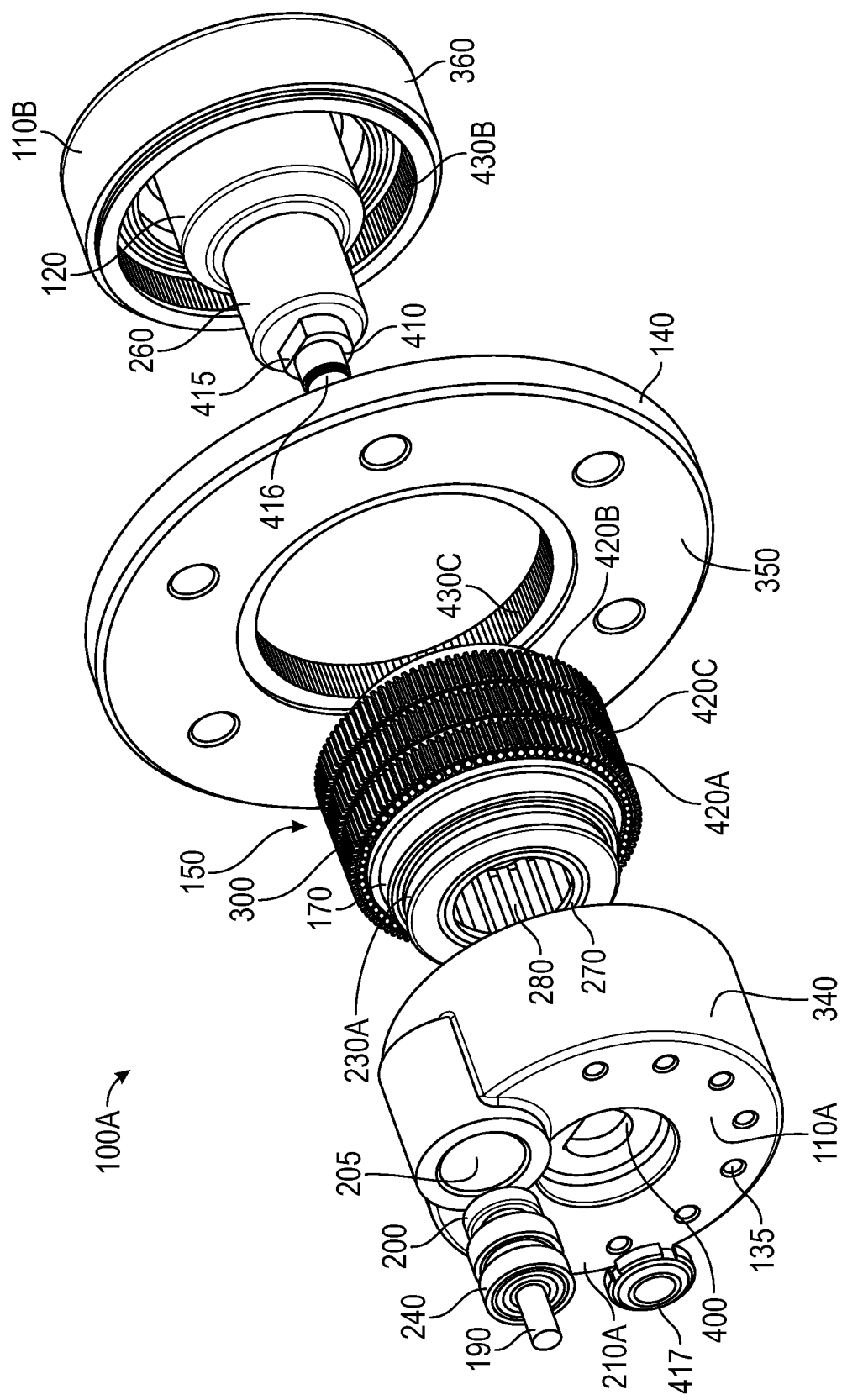
FIG. 1 is an exploded view of a gear box according to an embodiment.
Figure 2:
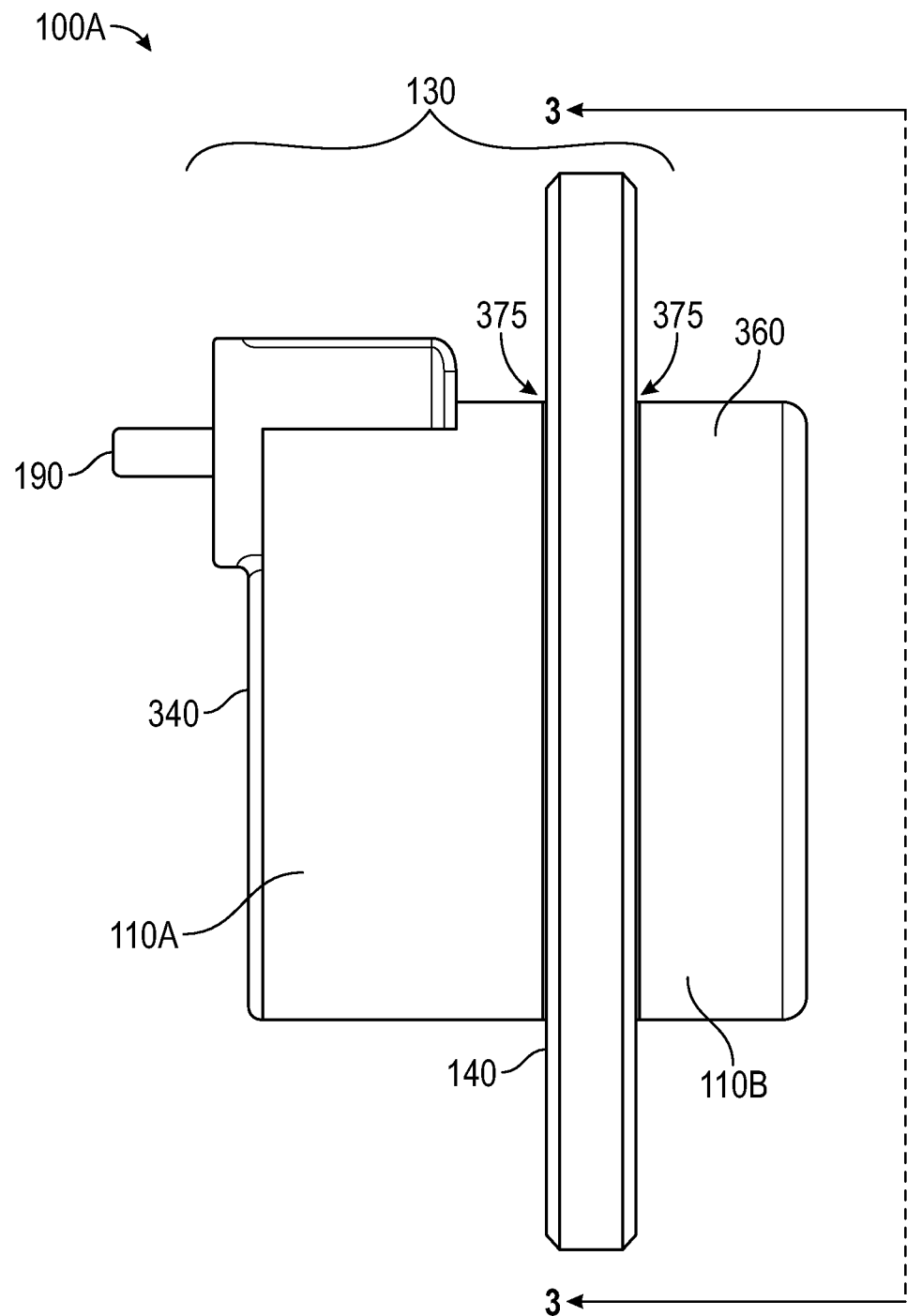
FIG. 2 is a side view of the gear box of FIG. 1.

A detailed description of one or more embodiments of the disclosed apparatus and method are presented herein by way of exemplification and not limitation with reference to the Figures.

Compound harmonic gearboxes may enable achieving a relatively high power density. Known compound harmonic gears, however, have a limited range of rotational motion. In view of such limitations, the disclosed embodiments provide a compound harmonic gearbox configured for continuous output rotation. Benefits of the disclosed compound harmonic gearbox include broader and more efficient application with earth moving equipment, power tools, robot end effectors, power steering gearboxes, power lift gates, and the like.

Turning to FIGS. 1-4, disclosed is a compound harmonic gearbox (gearbox) 100A according to an embodiment. The gearbox 100A includes ground gears generally referred to as 110 including a first ground gear 110A and a second ground gear 110B. The ground gears 110 are interconnected about a stationary shaft 120 to form a housing 130 (e.g., FIG. 2). According to an embodiment only the first ground gear 110A includes gearbox mounting features 135. The gearbox mounting features 135 may be threaded holes.

An output flange 140 is partially encased within the housing 130. A flex spline 150 is within the housing 130. The flex spline 150 drives the output flange 140 from gear meshing, discussed in greater detail below. A wave generator 170 is within the housing 130. The wave generator 170 drives the flex spline 150 from impulses generated from rotation of the wave generator 170.

An input shaft 190 includes an input gear 200 that drives the wave generator 170. The input shaft 190 extends along an axial direction A (axially) through an input-shaft channel 205 in the first ground gear 110A. The input-shaft channel 205 extends axially through a first axial end wall 210A of the first ground gear 110A. With the disclosed configuration the output flange 140 may rotate completely, (e.g., more than 360 degrees clockwise or counterclockwise) around the stationary shaft 120 with rotation of the input shaft 190 in the same direction (or in an opposing direction, depending on the harmonic gears configuration 100A).

The input gear 200 forms a first spur gear. An axial end 220 of the wave generator 170 forms a second spur gear 230A. The input gear 200 and second spur gear 230A mesh to enable the input gear 200 to drive the wave generator 170.

One or more input-shaft bearings 240 are disposed in the input-shaft channel 205 for rotational positioning the input shaft 190. The input shaft 190 is offset along a radial direction R (radially) from an axial center A of the stationary shaft 120.

A stationary-shaft bearing 250 is provided between the stationary shaft 120 and the wave generator 170. A portion 260 of the stationary shaft 120 forms a stationary-shaft inner race. A stationary-shaft bearing outer race 270 is disposed against the wave generator 170. A stationary-shaft bearing rolling element 280 is disposed between the stationary shaft 120 and the stationary-shaft bearing outer race 270.

A drive bearing 300 (e.g., FIG. 4) is disposed between the wave generator 170 and the flex spline 150. The drive bearing 300 includes a drive bearing inner race 310 disposed against the wave generator 170. A drive bearing outer race 320 is disposed against the flex spline 150. A drive bearing rolling element 330 is between the drive bearing inner race 310 and the drive bearing outer race 320. The drive bearing 300 has a same axial span as the flex spline 150. The drive bearing 300 is axially aligned with the flex spline 150.

A first radial outer shell 340 of the first ground gear 110A is disposed against a first axial side 350 of the output flange 140. A second radial outer shell 360 of the second ground gear 110B is disposed at a second axial side 370 of the output flange 140. From this configuration the output flange 140 is partially encased in the housing 130. There would be an axial clearance 375 between both axial sides of the output flange 140 and the outer shells 340, 360. This clearance 375 would allow for motion between the output flange 140 and the outer ground shells of the ground gear 110.

The stationary shaft 120 extends axially from a second axial end wall 210B of the second ground gear 110B toward the first ground gear 110A. The stationary shaft 120 is secured to the first axial end wall 210A of the first ground gear 110A, as discussed in further detail below. This configuration forms the housing 130.

The first axial end wall 210A includes an opening 400. The opening 400 forms a keyway. An axial end 410 of the stationary shaft 120 forms a key 415. This configuration prevents relative rotational motion between the ground gears 110 when connected. The axial end 410 of the stationary shaft 120 is includes threaded tip 416 configured to receive a nut 417. The nut 417 secures the ground gears 110 to one another. This configuration secures the housing 130 at the output flange 140, leaving the clearance 375 between the output flange 140 and the outer shells 340, 360.

Figure 3:
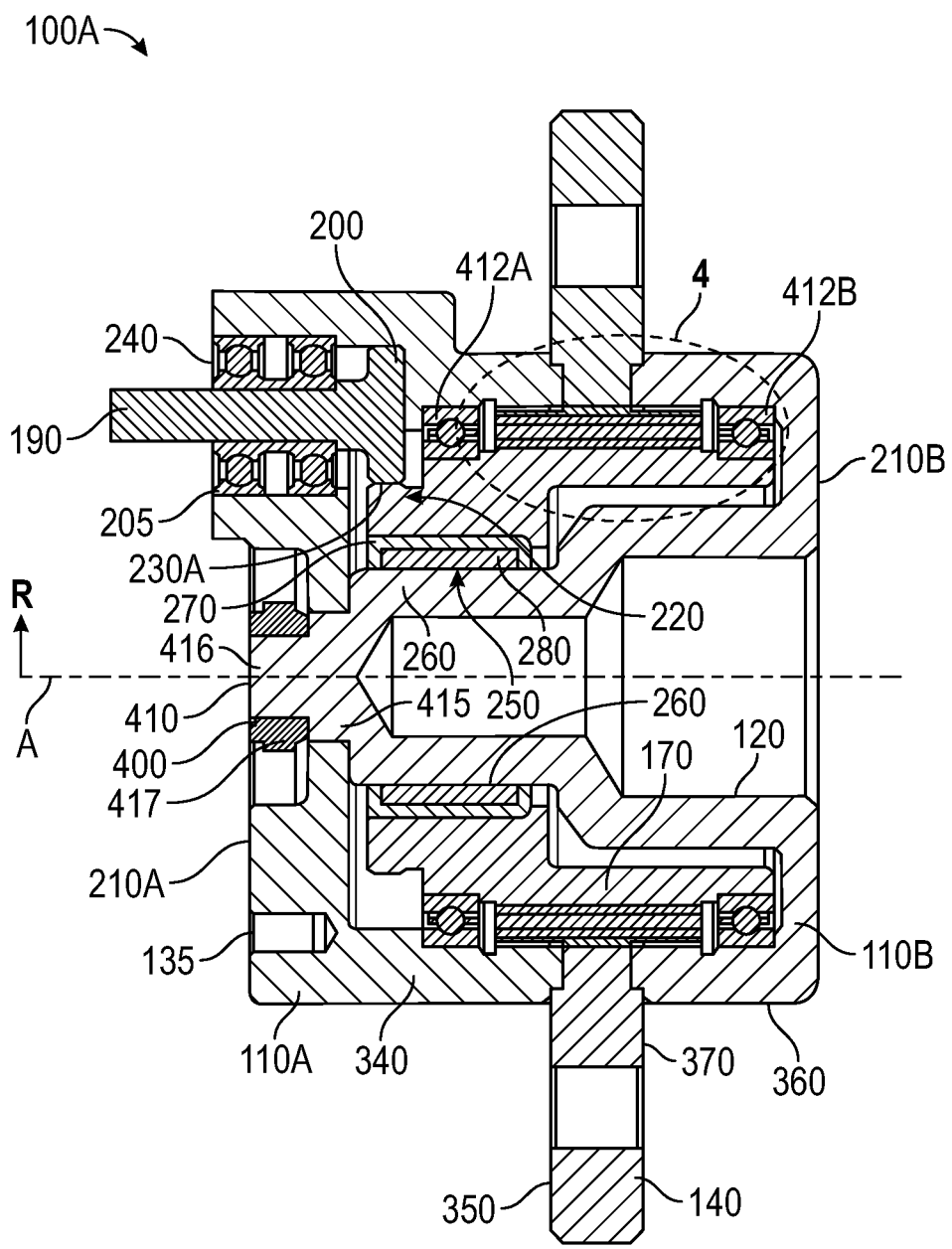
FIG. 3 is a cross sectional view along section lines A-A of the gear box of FIG. 2.
Figure 4:
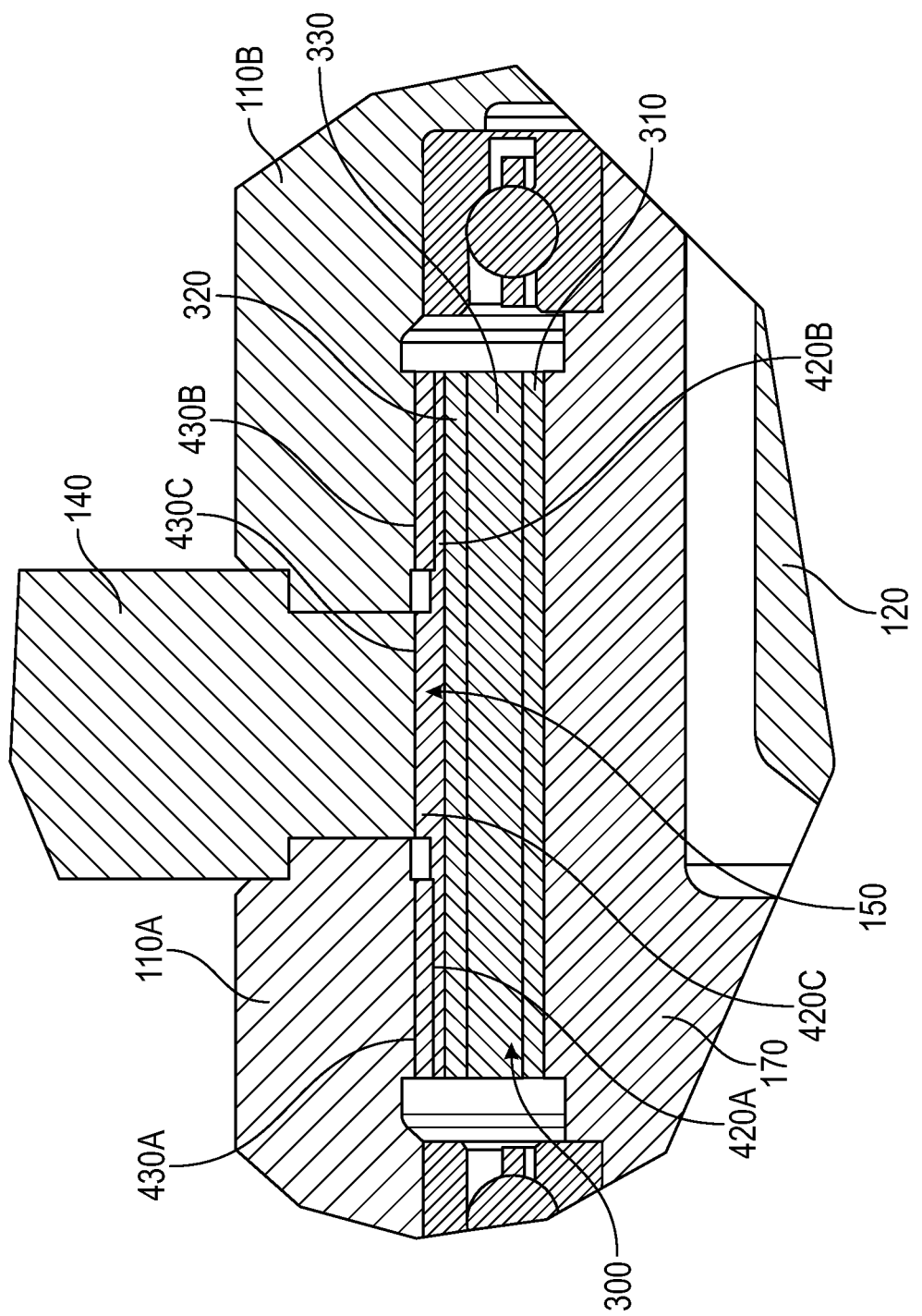
FIG. 4 is a detail of section B of the gear box of FIG. 3 and of section D of the gearbox of FIG. 5.

The gearbox 100A further includes a plurality of support bearings 412 (e.g., FIG. 3). The plurality of support bearings 412 include a first support bearing 412A and a second support bearing 412B. The plurality of support bearings 412 are positioned at axially opposing ends of the flex spline 150 and drive bearing 300. According to a disclosed embodiment, the plurality of support bearings 412 are ball bearings.

The flex spline 150 includes a plurality of splines 420 (e.g., FIG. 4) to thereby form a compound spline. For example, the flex spline 150 includes a first ground spline 420A, a second ground spline 420B and an output spline 420C. The second ground spline 420B is axially offset from the first ground spline 420A. The output spline 420C is axially intermediate the first ground spline 420A and the second ground spline 420B. Each of the first ground spline 420A, the second ground spline 420B and the output spline 420C are outer facing splines.

The first ground gear 110A includes first ground gear teeth 430A. The first ground gear teeth 430A mesh with the first ground spline 420A. The second ground gear 110B includes second ground gear teeth 430B. The second ground gear teeth 430B mesh with the second ground spline 420B. The output flange 140 includes output gear teeth 430C. The output gear teeth 430C mesh with the output spline 420C. Each of the first ground gear teeth 430A, the second ground gear teeth 430B and the output gear teeth 430C are inner facing teeth.

The plurality of splines 420 are configured to mesh with the ground gears 110 and the output flange 140 according to different gear ratios. The first ground spline 420A and the first ground gear teeth 430A have a first gear ratio (Ratio 1, below). The second ground spline 420B and the second ground gear teeth 430B also have the first gear ratio. The output spline 420C and the output gear teeth 430C have a second gear ratio (Ratio 2, below) that differs from the first gear ratio. The splines 420 are integral to same structure, that is, the flex spline 150. Thus the different gear ratios together form a compound gear ratio (Compound Ratio, below). The compound gear ratio provides a differential motion between the ground gears 110 and the output flange 140.

The compound gear ratio is represented as the difference of the individual gear ratios:

$$\text{Ratio 1} = \frac{\text{Teeth in Output Spline (420}c)}{\text{Teeth in Output Spline (420}c) - \text{Teeth in Outpt Flange (430}C)}$$

$$\text{Ratio 2} = \frac{\text{Teeth in First Ground Spline (420}a)}{\text{Teeth in First Ground Spline (420}a) - \text{Teeth in First Ground Gear (430}a)}$$

$$\text{Compound Ratio} = \frac{1}{\frac{1}{\text{Ratio1}} - \frac{1}{\text{Ratio2}}}$$

The second spur gear 230A and the first ground gear teeth 430A are axially positioned at axially opposing ends of the stationary-shaft bearing 250 (e.g., FIG. 3). The first support bearing 412A is positioned axially intermediate the second spur gear 230A and the first ground gear teeth 430A.

Figure 5:
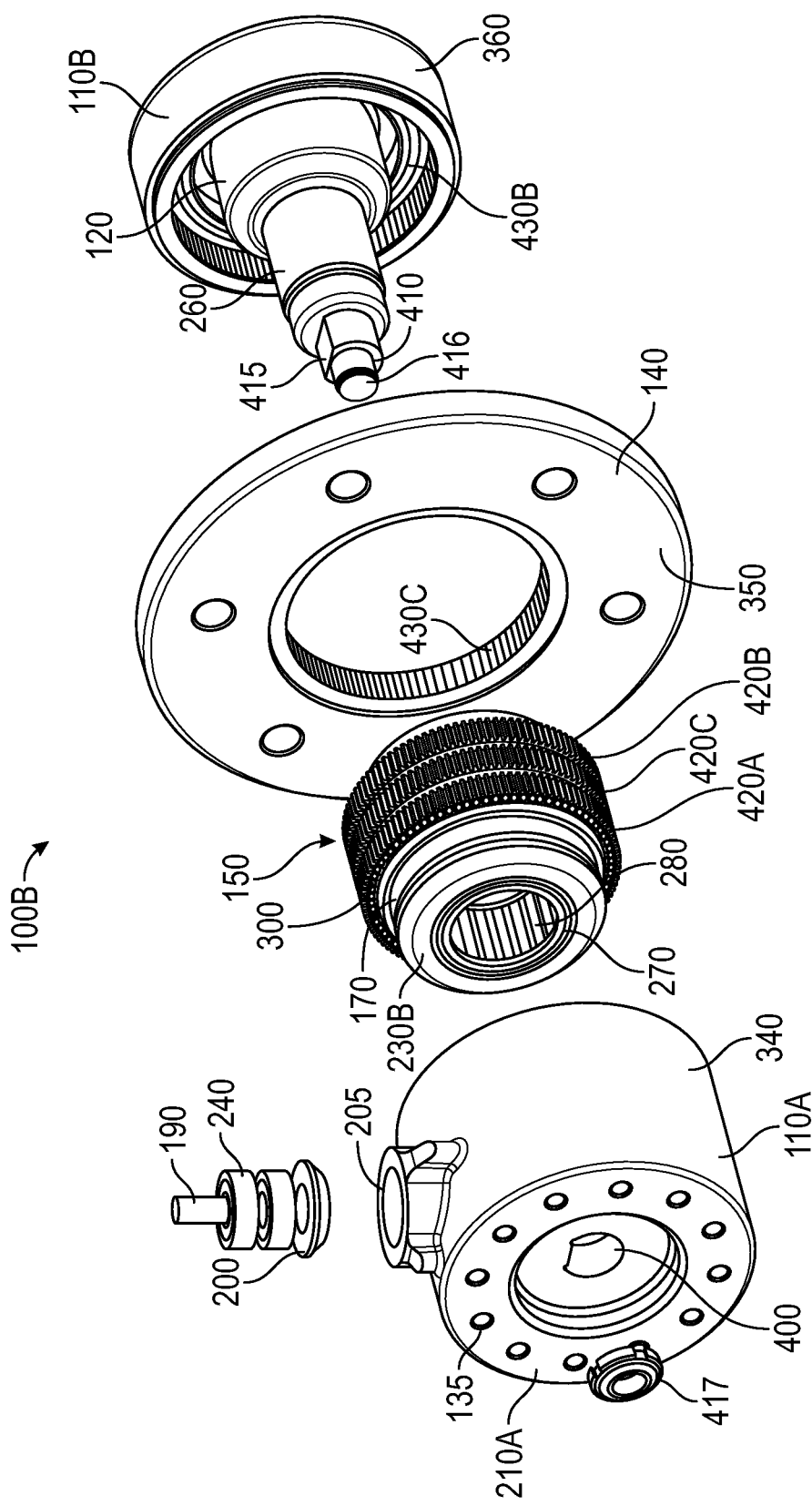
FIG. 5 is an exploded view of another gear box according to an embodiment.
Figure 6:
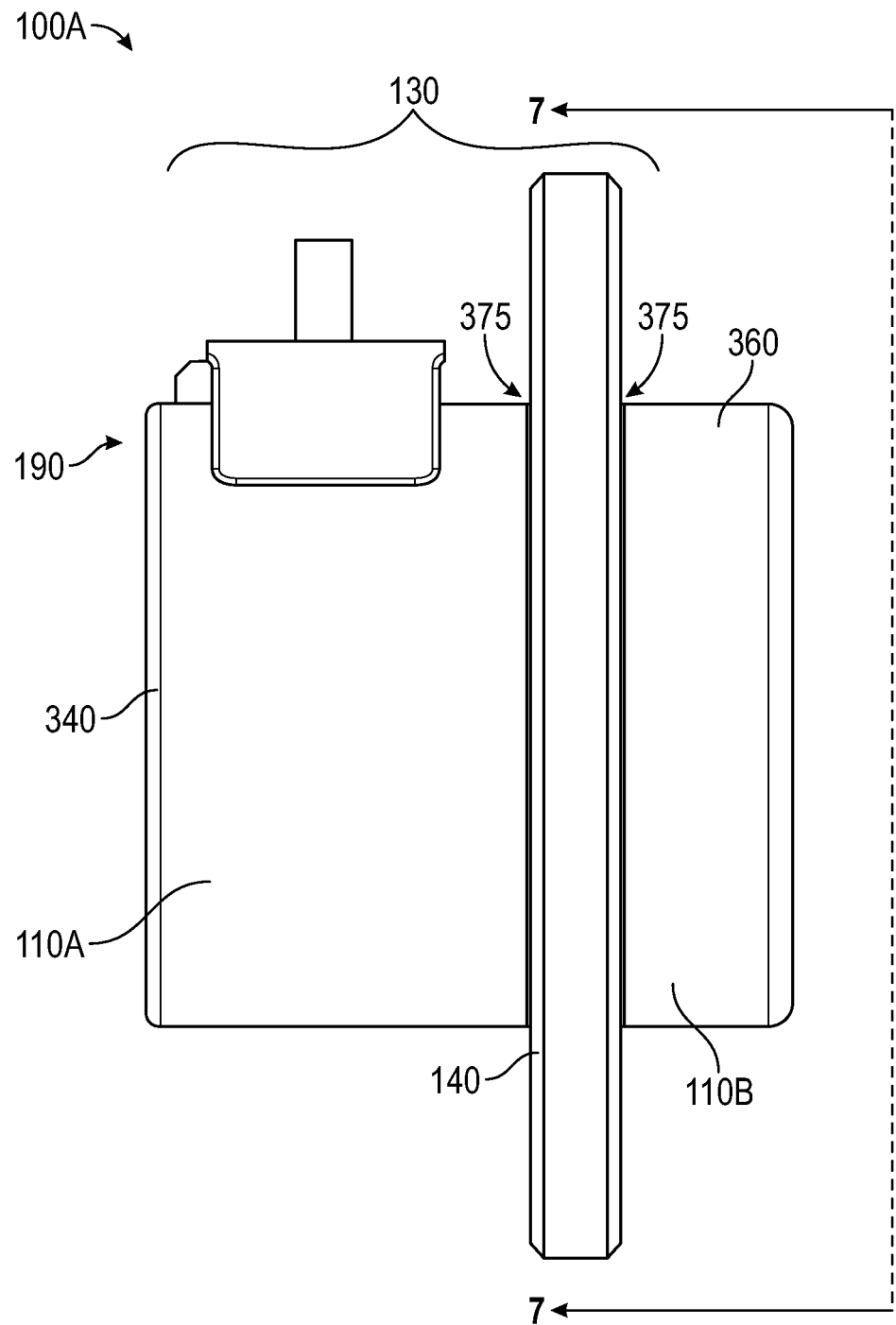
FIG. 6 is a side view of the gear box of FIG. 5.
Figure 7:
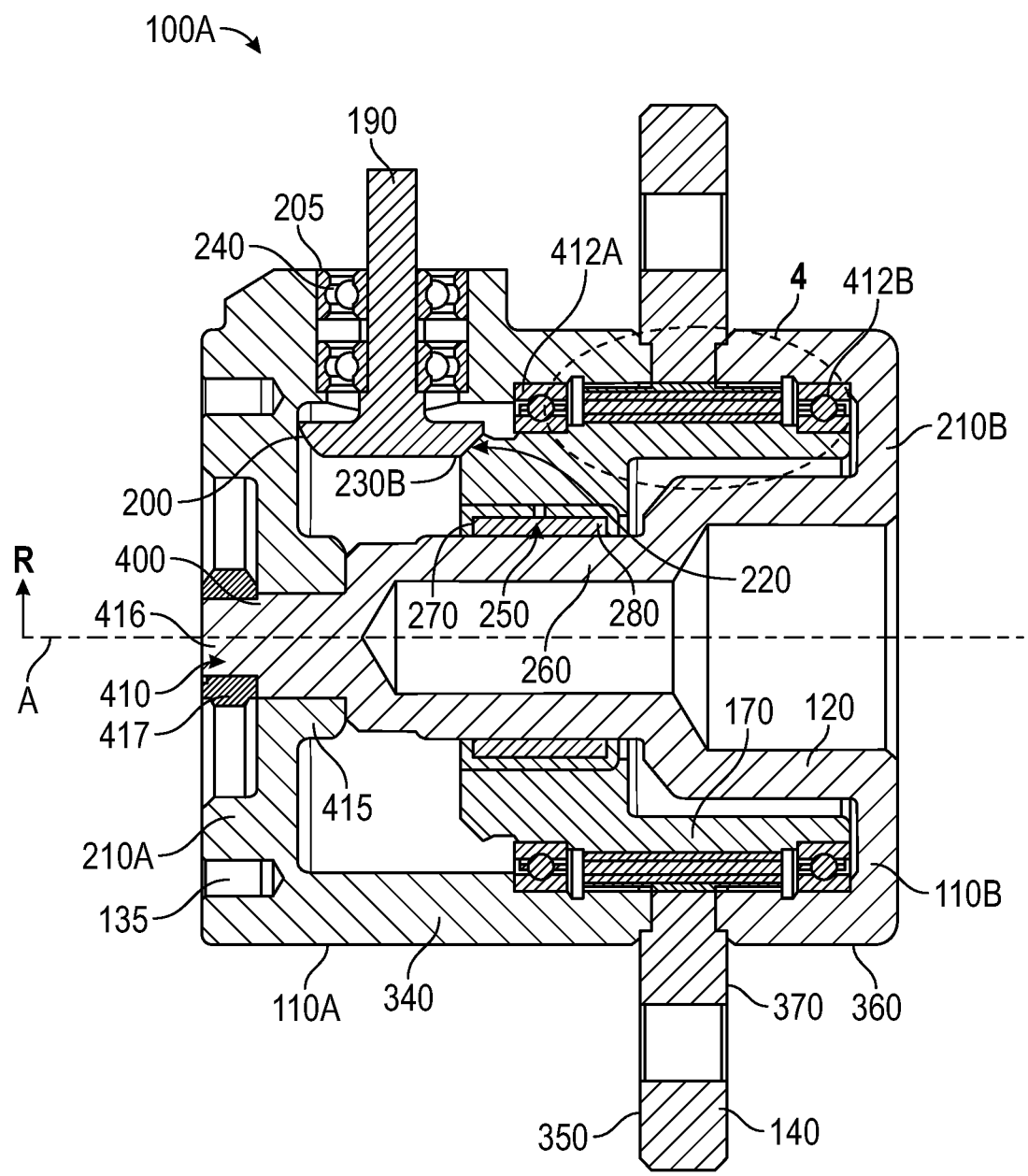
FIG. 7 is a cross sectional view along section lines C-C of the gear box of FIG. 6.

Turning to FIGS. 5-7, disclosed is a second compound harmonic gearbox (the second gearbox) 100A according to an embodiment. Aspects of the second gearbox 100B shall be identified as by same reference numbers as aspects of the gearbox 100A of FIGS. 1-4. Differences, if any, are those expressly identified below.

The second gearbox 100B includes ground gears generally referred to as 110 including a first ground gear 110A and a second ground gear 110B. The ground gears 110 are interconnected about a stationary shaft 120 to form a housing 130 (e.g., FIG. 6). According to an embodiment only the first ground gear 110A includes gearbox mounting features 135. The gearbox mounting features 135 may be threaded holes.

An output flange 140 is partially encased within the housing 130. A flex spline 150 is within the housing 130. The flex spline 150 drives the output flange 140 from gear meshing, discussed in greater detail below. A wave generator 170 is within the housing 130. The wave generator 170 drives the flex spline 150 from impulses generated from rotation of the wave generator 170.

An input shaft 190 includes an input gear 200 that drives the wave generator 170. The input shaft 190 extends radially through an input-shaft channel 205 in the first ground gear 110A. The input-shaft channel 205 extends radially through a first radial outer shell 340 of the first ground gear 110A. With the disclosed configuration the output flange 140 may rotate completely, more than 360 degrees clockwise or counterclockwise, around the stationary shaft 120 with rotation of the input shaft 190 in one direction or another direction. As illustrated, the input shaft 190 and output flange 140 rotate perpendicularly to one another.

The input gear 200 forms a first bevel gear. An axial end 220 of the wave generator 170 forms a second bevel gear 230B. The input gear 200 and second bevel gear 230B mesh to enable the input gear 200 to drive the wave generator 170.

One or more input-shaft bearings 240 are disposed in the input-shaft channel 205 for rotational positioning the input shaft 190.

A stationary-shaft bearing 250 is provided between the stationary shaft 120 and the wave generator 170. A portion 260 of the stationary shaft 120 forms a stationary-shaft bearing inner race. A stationary-shaft bearing outer race 270 is disposed against the wave generator 170. A stationary-shaft bearing rolling element 280 is disposed between the stationary shaft 120 and the stationary-shaft bearing outer race 270.

A drive bearing 300 (e.g., FIG. 4, which is equally applicable in this embodiment) is disposed between the wave generator 170 and the flex spline 150. The drive bearing 300 includes a drive bearing inner race 310 disposed against the wave generator 170. A drive bearing outer race 320 is disposed against the flex spline 150. Drive bearing rolling elements 330 are between the drive bearing inner race 310 and the drive bearing outer race 320. The drive bearing 300 has a same axial span as the flex spline 150. The drive bearing 300 is axially aligned with the flex spline 150.

The first radial outer shell 340 of the first ground gear 110A is disposed against a first axial side 350 of the output flange 140. A second radial outer shell 360 of the second ground gear 110B is disposed against a second axial side 370 of the output flange 140. From this configuration the output flange 140 is partially encased in the housing 130.

The stationary shaft 120 extends axially from a second axial end wall 210B of the second ground gear 110B toward the first ground gear 110A. The stationary shaft 120 is secured to a first axial end wall 210A of the first ground gear 110A, as discussed in further detail below. This configuration forms the housing 130.

The first axial end wall 210A includes an opening 400. The opening 400 forms a keyway. An axial end 410 of the stationary shaft 120 is formed to include a key 415. This configuration prevents relative rotational motion between the ground gears 110 when connected. The axial end 410 of the stationary shaft 120 is includes threaded tip 416 configured to receive a nut 417. The nut 417 secures the ground gears 110 to one another. This configuration secures the housing 130 at the output flange 140, leaving the clearance 375 between the output flange 140 and the outer shells 340, 360.

The gearbox 100A further includes a plurality of support bearings 412 (e.g., FIG. 7). The plurality of support bearings 412 include a first support bearing 412A and a second support bearing 412B. The plurality of support bearings 412 are positioned at axially opposing ends of the flex spline 150 and drive bearing 300. According to a disclosed embodiment, the plurality of support bearings 412 are ball bearings.

The flex spline 150 includes a plurality of splines 420 (e.g., FIG. 4) to thereby form a compound spline. For example, the flex spline 150 includes a first ground spline 420A, a second ground spline 420B and an output spline 420C. The second ground spline 420B is axially offset from the first ground spline 420A. The output spline 420C is axially intermediate the first ground spline 420A and the second ground spline 420B. Each of the first ground spline 420A, the second ground spline 420B and the output spline 420C are outer facing splines.

The first ground gear 110A includes first ground gear teeth 430A. The first ground gear teeth 430A mesh with the first ground spline 420A. The second ground gear 110B includes second ground gear teeth 430B. The second ground gear teeth 430B mesh with the second ground spline 420B. The output flange 140 includes output gear teeth 430C. The output gear teeth 430C mesh with the output spline 420C. Each of the first ground gear teeth 430A, the second ground gear teeth 430B and the output gear teeth 430C are inner facing teeth.

The plurality of splines 420 are configured to mesh with the ground gears 110 and the output flange 140 according to different gear ratios. The first ground spline 420A and the first ground gear teeth 430A have a first gear ratio (Ratio 1, below). The second ground spline 420B and the second ground gear teeth 430B also have the first gear ratio. The output spline 420C and the output gear teeth 430C have a second gear ratio (Ratio 2, below) that differs from the first gear ratio. The splines 420 are integral to same structure, that is, the flex spline 150. Thus the different gear ratios together form a compound gear ratio (Compound Ratio, below). The compound gear ratio provides a differential motion between the ground gears 110 and the output flange 140.

The compound gear ratio is represented as the difference of the individual gear ratios:

$$\text{Ratio 1} = \frac{\text{Teeth in Output Spline (420}c\text{)}}{\text{Teeth in Output Spline (420}c\text{)} - \text{Teeth in } Output \text{ Flange (430}C\text{)}}$$

$$\text{Ratio 2} = \frac{\text{Teeth in First Ground Spline (420}a\text{)}}{\text{Teeth in First Ground Spline (420}a\text{)} - \text{Teeth in First Ground Gear (430}a\text{)}}$$

$$\text{Compound Ratio} = \frac{1}{\frac{1}{\text{Ratio1}} - \frac{1}{\text{Ratio2}}}$$

The second bevel gear 230B and the first ground gear teeth 430A are at axially positioned at axially opposing ends of the stationary-shaft bearing 250 (e.g., FIG. 7). The first support bearing 412A is positioned axially intermediate the second bevel gear 230B and the first ground gear teeth 430A.

The above configurations are balanced to react all generated loads through the gearbox mounting features 135 on the first ground gear 110A. From the above configuration an external movable structure connected to the output flange 140 may rotate relative to an external stationary structure connected to the first ground gear 110A and the input shaft 190. Such external stationary structure and external movable structure may be components of, for example, earth moving equipment, power tools, robot end effectors, power steering gearboxes, power lift gates, and the like.

Figure 8:
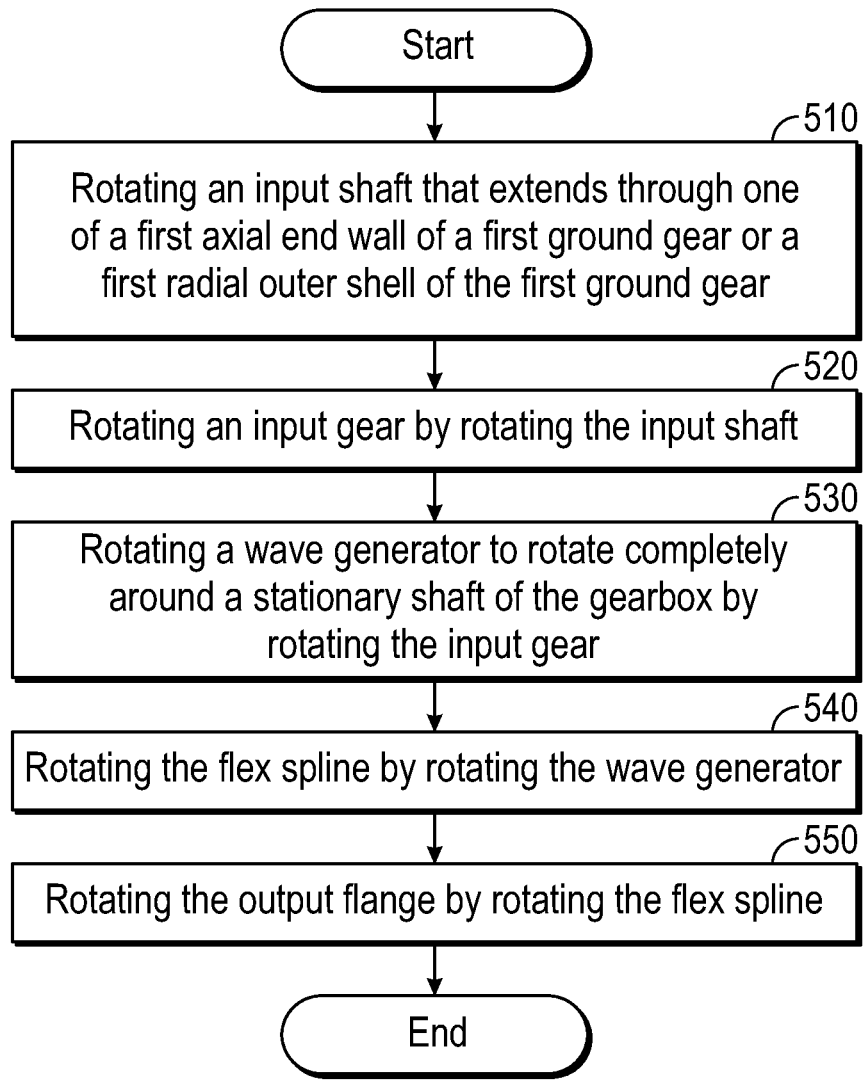
FIG. 8 is a flowchart of a method of operating the gearboxes of FIGS. 1 and 5 according to an embodiment.

Turning to FIG. 8, a flowchart shows a method of operating the gearbox 100A (or 100B). As shown in block 510, the method includes rotating an input shaft 190 that extends through one of a first axial end wall 210A of a first ground gear 110A or a first radial outer shell 340 of the first ground gear 110A. As indicated the first ground gear 110A is interconnected with a second ground gear 110B about the stationary shaft 120 to form the housing 130. Additionally, only the first ground gear 110A includes gearbox mounting features 135. As shown in block 520 the method includes rotating an input gear 200 by rotating the input shaft 190. As shown in block 530 the method includes rotating a wave generator 170 by rotating by rotation the input gear 200. The wave generator 170 is configured for rotating completely around a stationary shaft 120 of the gearbox 100A (or 100B). As shown in block 530 the method includes rotating the flex spline 150 by rotating the wave generator 170. As shown in block 540 the method includes rotating the output flange 140 by rotating the flex spline 150. From this action, the output flange 140 rotates completely around the stationary shaft 120.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A compound harmonic gearbox comprising:
   a first ground gear and a second ground gear being interconnected about a stationary shaft to form a housing, wherein only the first ground gear includes gearbox mounting features;
   an output flange partially encased within the housing;
   a flex spline within the housing that drives the output flange;
   a wave generator within the housing that drives the flex spline;
   an input shaft with an input gear that drives the wave generator, the input shaft extending through the first ground gear, wherein the output flange is configured to rotate completely around the stationary shaft by rotating the input shaft,
   wherein:
      the input shaft extends through an input-shaft channel in one of a first axial end wall of the first ground gear and a first radial outer shell of the first ground gear;
      the input shaft extends axially through the first axial end wall and is radially offset from an axial center of the stationary shaft;

the input gear defines a first spur gear, and an axial end of the wave generator defines a second spur gear that meshes with the first spur gear;

a stationary-shaft bearing, wherein:
- a portion of the stationary shaft defines a stationary-shaft bearing inner race;
- a stationary-shaft bearing outer race is connected to the wave generator; and
- a stationary-shaft bearing rolling element is disposed therebetween.

2. The gearbox of claim 1, wherein one or more input-shaft bearings are disposed in the input-shaft channel for rotational positioning of the input shaft.

3. The gearbox of claim 1, wherein:
the input shaft extends radially through the first radial outer shell of the first ground gear; and
the input gear defines a first bevel gear and the axial end of the wave generator defines a second bevel gear that meshes with the input gear.

4. The gearbox of claim 1, further comprising a drive bearing including a drive bearing inner race connected to the wave generator, a drive bearing outer race connected to the flex spline, and a drive bearing rolling element therebetween.

5. The gearbox of claim 4, wherein the drive bearing and the flex spline have a same axial span and are axially aligned with one another.

6. The gearbox of claim 1, wherein the first radial outer shell of the first ground gear is disposed against a first axial side of the output flange and a second radial outer shell of the second ground gear is disposed against a second axial side of the output flange, whereby the output flange is partially encased in the housing.

7. The gearbox of claim 1, wherein the stationary shaft extends axially from a second axial end wall of the second ground gear and is secured to the first axial end wall of the first ground gear to thereby form the housing.

8. The gearbox of claim 1, wherein the first axial end wall includes an opening that forms a keyway and the stationary shaft includes a key.

9. The gearbox of claim 8, wherein an axial end of the stationary shaft includes a threaded tip configured to receive a nut to secure the first ground gear and the second ground gear to one another, thereby securing the housing at the output flange.

10. The gearbox of claim 1, further comprising a plurality of support bearings respectively disposed on axially opposing ends of the flex spline.

11. The gearbox of claim 10, wherein the flex spline includes a plurality of splines that are outer facing, including an output spline, a first ground spline on one side of the output spline and a second ground spline on another side of the output spline, so that the second ground spline is axially offset from the first ground spline, and the output spline is axially between the first ground spline and the second ground spline, whereby the flex spline is configured as a compound spline.

12. The gearbox of claim 11, wherein
the output flange includes output gear teeth that mesh with the output spline,
the first ground gear includes first ground gear teeth that mesh with the first ground spline, and the second ground gear includes second ground gear teeth that mesh with the second ground spline.

13. The gearbox of claim 12, wherein
the first ground spline and the first ground gear teeth are configured to mesh to thereby form a first gear ratio, and
the output spline and the output gear teeth are configured to mesh to thereby form a second gear ratio that differs from the first gear ratio to form a compound gear ratio.

14. The gearbox of claim 13, wherein the second ground spline and the second ground gear teeth are configured to mesh and form the first gear ratio.

15. The gearbox of claim 12, wherein:
the second spur gear and the first ground gear teeth are axially positioned at axially opposing ends of the stationary-shaft bearing; and
a first support bearing of the plurality of support bearings is positioned axially intermediate the second spur gear and the first ground gear teeth.

16. The gearbox of claim 1, wherein the gearbox mounting features are threaded-holes.

17. A method of operating the compound harmonic gearbox of claim 4, comprising:
rotating the input shaft that extends through one of the first axial end wall of the first ground gear or the first radial outer shell of the first ground gear,
wherein the first ground gear is interconnected with the second ground gear about the stationary shaft to form the housing, and only the first ground gear includes the gearbox mounting features;
rotating the input gear by rotating the input shaft;
rotating the wave generator by rotating the input gear, the wave generator rotating completely around the stationary shaft of the gearbox;
rotating the flex spline by rotating the wave generator; and
rotating the output flange by rotating the flex spline, whereby the output flange rotates completely around the stationary shaft.

* * * * *